US012674339B2

(12) United States Patent
Chuang et al.

(10) Patent No.: US 12,674,339 B2
(45) Date of Patent: Jul. 7, 2026

(54) ELECTRONIC LOCK AND METHOD FOR SETTING UP ELECTRONIC LOCK

(71) Applicant: TONG LUNG METAL INDUSTRY CO., LTD., Chiayi County (TW)

(72) Inventors: Pai-Hsiang Chuang, New Taipei City (TW); Ding-Sian Cai, Chiayi County (TW); Jui-Chieh Cheng, Chiayi County (TW); Tsung-Li Wu, Chiayi City (TW); Chen-Ming Lin, Chiayi County (TW)

(73) Assignee: Tong Lung Metal Industry Co., Ltd., Chiayi County (TW)

( * ) Notice: Subject to any disclaimer, the term of this patent is extended or adjusted under 35 U.S.C. 154(b) by 198 days.

(21) Appl. No.: 18/408,927

(22) Filed: Jan. 10, 2024

(65) Prior Publication Data

US 2024/0240496 A1 Jul. 18, 2024

(30) Foreign Application Priority Data

Jan. 13, 2023 (TW) ................................ 112101589

(51) Int. Cl.
*E05B 47/00* (2006.01)
*E05B 63/04* (2006.01)

(52) U.S. Cl.
CPC .......... *E05B 47/0012* (2013.01); *E05B 63/04* (2013.01); *E05B 2047/0069* (2013.01)

(58) Field of Classification Search
CPC ......... E05B 2045/0665; E05B 47/0012; E05B 47/02; E05B 47/026; E05B 2047/0014; E05B 2047/0018; E05B 2047/002; E05B 2047/0036; E05B 2047/0048; E05B 2047/0053; E05B 2047/0054; E05B 2047/0069; E05B 2047/0091; E05B 63/04
See application file for complete search history.

(56) References Cited

U.S. PATENT DOCUMENTS

| | | | | |
|---|---|---|---|---|
| 9,097,037 | B2 * | 8/2015 | Mckibben | E05B 63/04 |
| 10,487,544 | B2 * | 11/2019 | Ainley | G01D 5/145 |
| 11,091,936 | B2 * | 8/2021 | Beck | E05B 17/22 |
| 11,702,863 | B2 * | 7/2023 | Beck | E05B 63/04 292/144 |
| 12,006,735 | B2 * | 6/2024 | Bogdanov | E05B 65/1053 |

(Continued)

*Primary Examiner* — Kristina R Fulton
*Assistant Examiner* — Noah Horowitz
(74) *Attorney, Agent, or Firm* — Merchant & Gould P.C.

(57) ABSTRACT

An electronic lock includes a locking mechanism and a control device. The locking mechanism includes an electronic driving module, a deadbolt, and a turning-piece module configured to be driven by the electronic driving module or to be manually operated to rotate among a first position, a second position and a third position, and to drive the deadbolt to move while rotating. The control device includes three Hall sensors surrounding a rotation axis of the turning-piece module, a magnetic component co-rotatable with the turning-piece module relative to the Hall sensors, and a control module. Each Hall sensor generates a sensing signal upon detecting the magnetic component. The control module is configured to activate a left-open setting or a right-open setting according to two sensing signals that are first received respectively from two of the Hall sensors without controlling the electronic driving module to drive the turning-piece module to rotate.

5 Claims, 19 Drawing Sheets

(56) References Cited

U.S. PATENT DOCUMENTS

| | | | | |
|---|---|---|---|---|
| 12,067,855 | B2 * | 8/2024 | Abueshsheikh ....... | G08B 25/00 |
| 12,180,750 | B2 * | 12/2024 | Abueshsheikh ... | G07C 9/00309 |
| 12,234,672 | B2 * | 2/2025 | Lin ....................... | E05B 47/026 |
| 2011/0185554 | A1 * | 8/2011 | Huang .................... | B23P 11/00 70/277 |
| 2011/0259059 | A1 * | 10/2011 | Wu ..................... | E05B 63/0017 70/91 |
| 2023/0116243 | A1 * | 4/2023 | Lu ....................... | E05B 47/0012 70/277 |

* cited by examiner

ELECTRONIC LOCK AND METHOD FOR SETTING UP ELECTRONIC LOCK

CROSS-REFERENCE TO RELATED APPLICATION

This application claims priority to Taiwanese Invention Patent Application No. 112101589, filed on Jan. 13, 2023, the entire disclosure of which is incorporated by reference herein.

FIELD

The disclosure relates to an electronic lock and a method for setting up an electronic lock.

BACKGROUND

A conventional electronic lock, when being installed on a door, has to be manually configured to a left-open setting or a right-open setting depending on the door type (i.e., a left-hand door or a right-hand door), so that the conventional electronic lock is capable of performing locking and unlocking operation on the door accordingly. However, the method of manually setting up the conventional electronic lock is prone to human error. When the conventional electronic lock is incorrectly set up, the conventional electronic lock may perform the locking and the unlocking operation in a wrong direction, thus causing malfunctions and damages to the conventional electronic lock.

SUMMARY

Therefore, an object of the disclosure is to provide an electronic lock and a method for setting up an electronic lock that can alleviate at least one of the drawbacks of the prior art.

According to the disclosure, the electronic lock includes a locking mechanism and a control device.

The locking mechanism includes an electronic driving module, a deadbolt, and a turning-piece module that is connected to the electronic driving module and the deadbolt. The turning-piece module is configured to be manually operated to rotate among a first position corresponding to a first state of the electronic lock, and a second position and a third position both corresponding to a second state of the electronic lock. The turning-piece module is further configured to drive the deadbolt to move between a projection position and a retraction position while rotating.

The control device includes three Hall sensors disposed to surround a rotation axis of the turning-piece module and angularly spaced apart from each other, a magnetic component disposed on the turning-piece module so as to co-rotate with the turning-piece module relative to the Hall sensors, and a control module electrically connected to the Hall sensors and the electronic driving module. The control module is configured to control the electronic driving module to operate for driving the turning-piece module to rotate. Each of the Hall sensors is configured to detect a presence of the magnetic component and to generate a sensing signal upon detecting the magnetic component.

The control module is further configured to operate in an opening-side setting mode for activating one of a left-open setting and a right-open setting according to two of the sensing signals that are first received respectively from two of the Hall sensors without controlling the electronic driving module to drive the turning-piece module to rotate. The control module is further configured to control the electronic driving module to drive the turning-piece module to rotate between the first position and one of the second position and the third position according to one of the left-open setting and the right-open setting that has been activated.

According to the disclosure, a method for setting up the electronic lock includes: the control module operating in the opening-side setting mode and receiving one or more of the sensing signals from the Hall sensors without controlling the electronic driving module to drive the turning-piece module to rotate; the control module analyzing two of the sensing signals that are first received respectively from two of the Hall sensors; and the control module activating one of the left-open setting and the right-open setting based on the two of the sensing signals that are first received.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
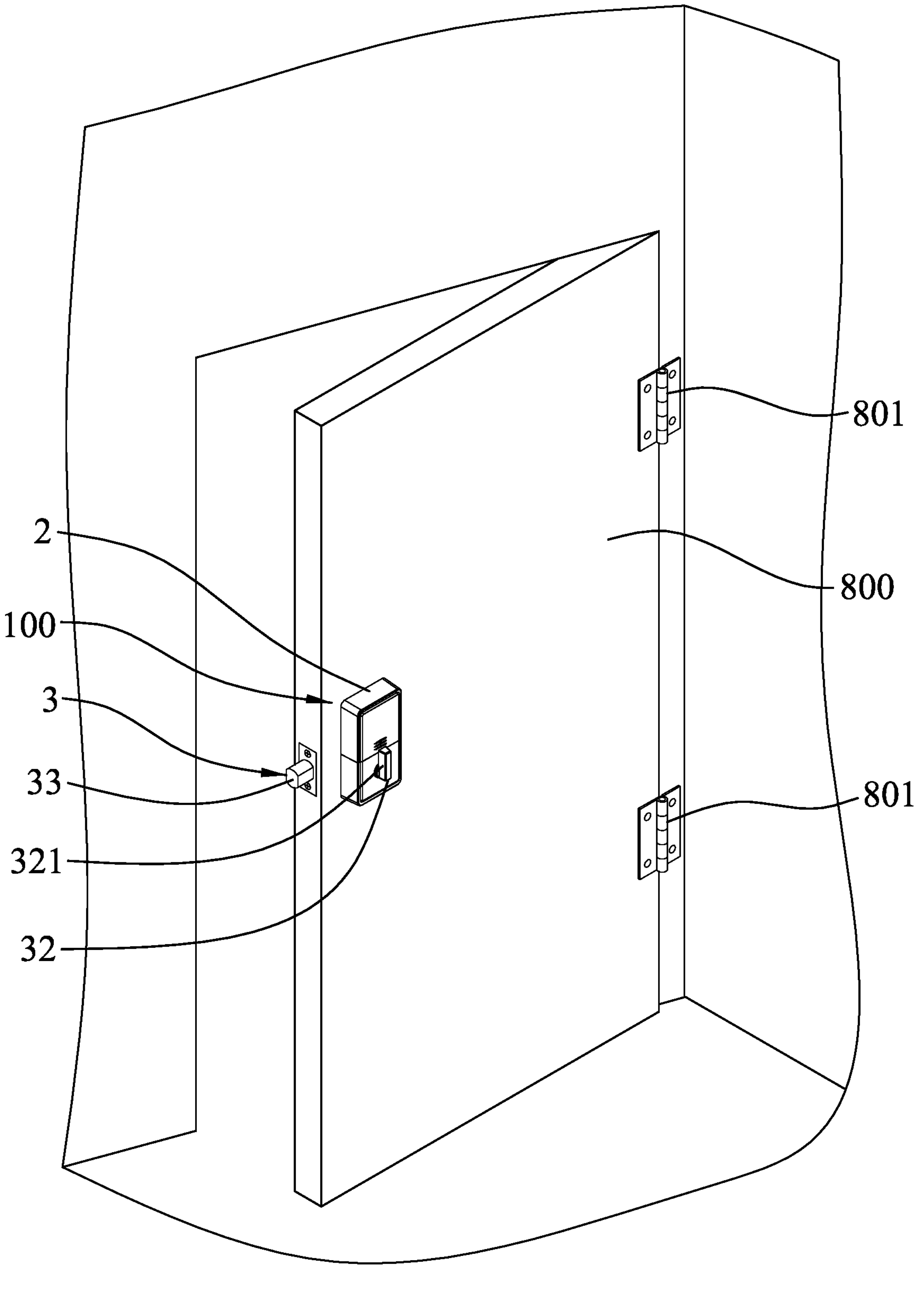
FIG. 1 is a fragmentary perspective view illustrating an electronic lock installed on a left-hand door according to a first embodiment of the present disclosure, where a deadbolt is in a projection position.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as “top,” “bottom,” “upper,” “lower,” “on,” “above,” “over,” “downwardly,” “upwardly” and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
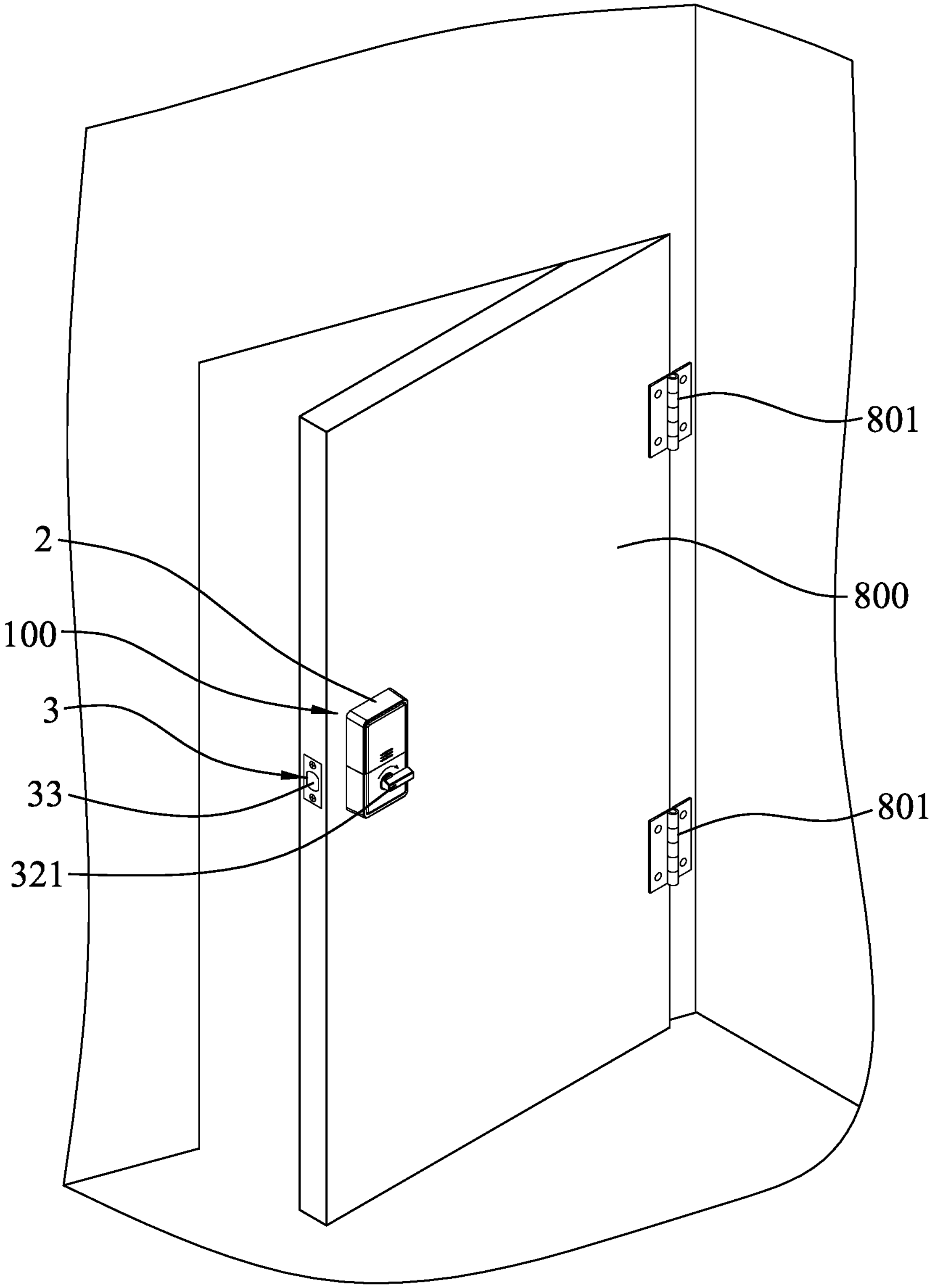
FIG. 2 is a fragmentary perspective view similar to FIG. 1 illustrating the deadbolt of the electronic lock in a retraction position.
Figure 3:
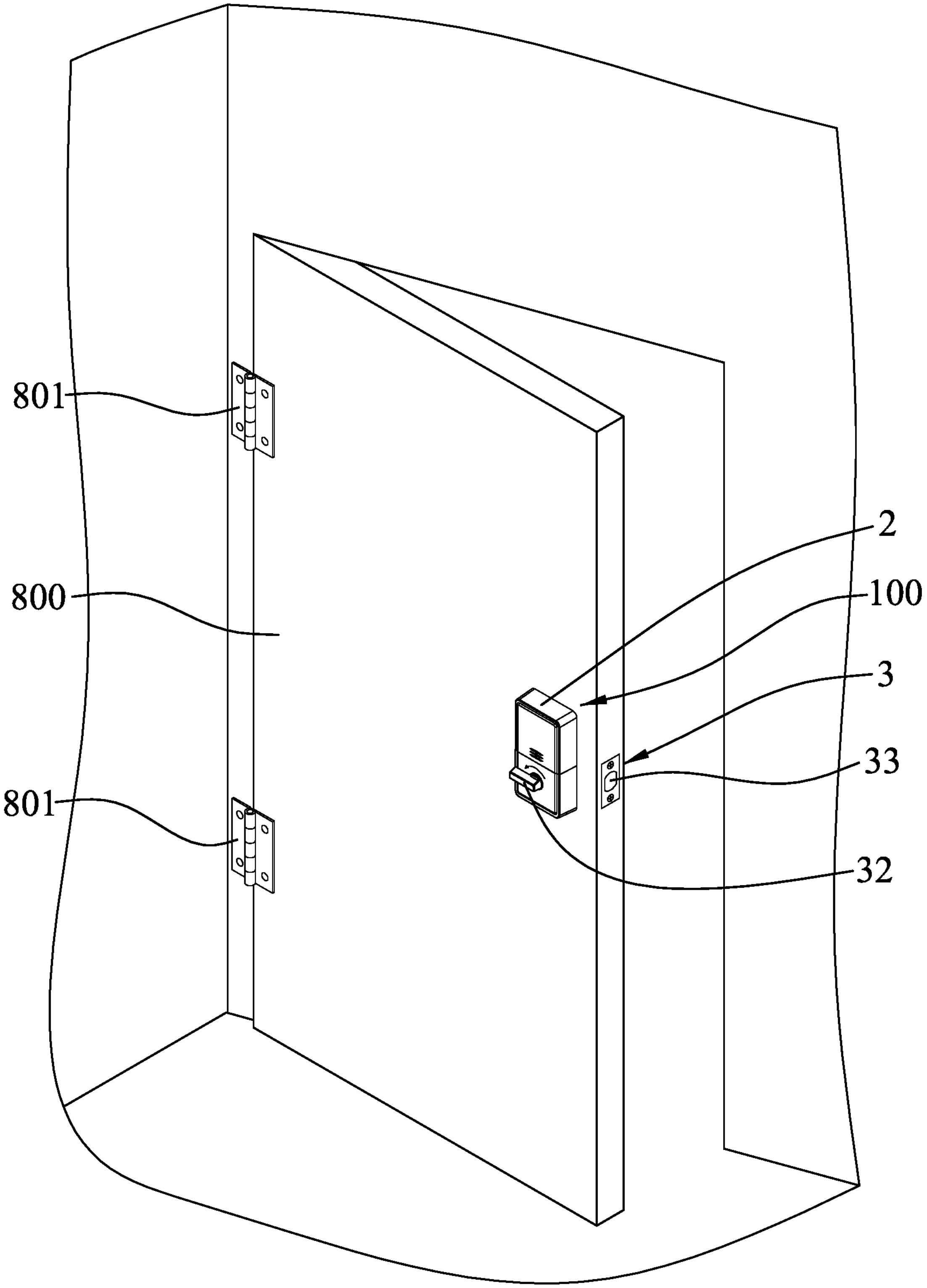
FIG. 3 is a fragmentary perspective view illustrating the electronic lock installed on a right-hand door according to the first embodiment of the present disclosure, where the deadbolt is in the retraction position.
Figure 4:
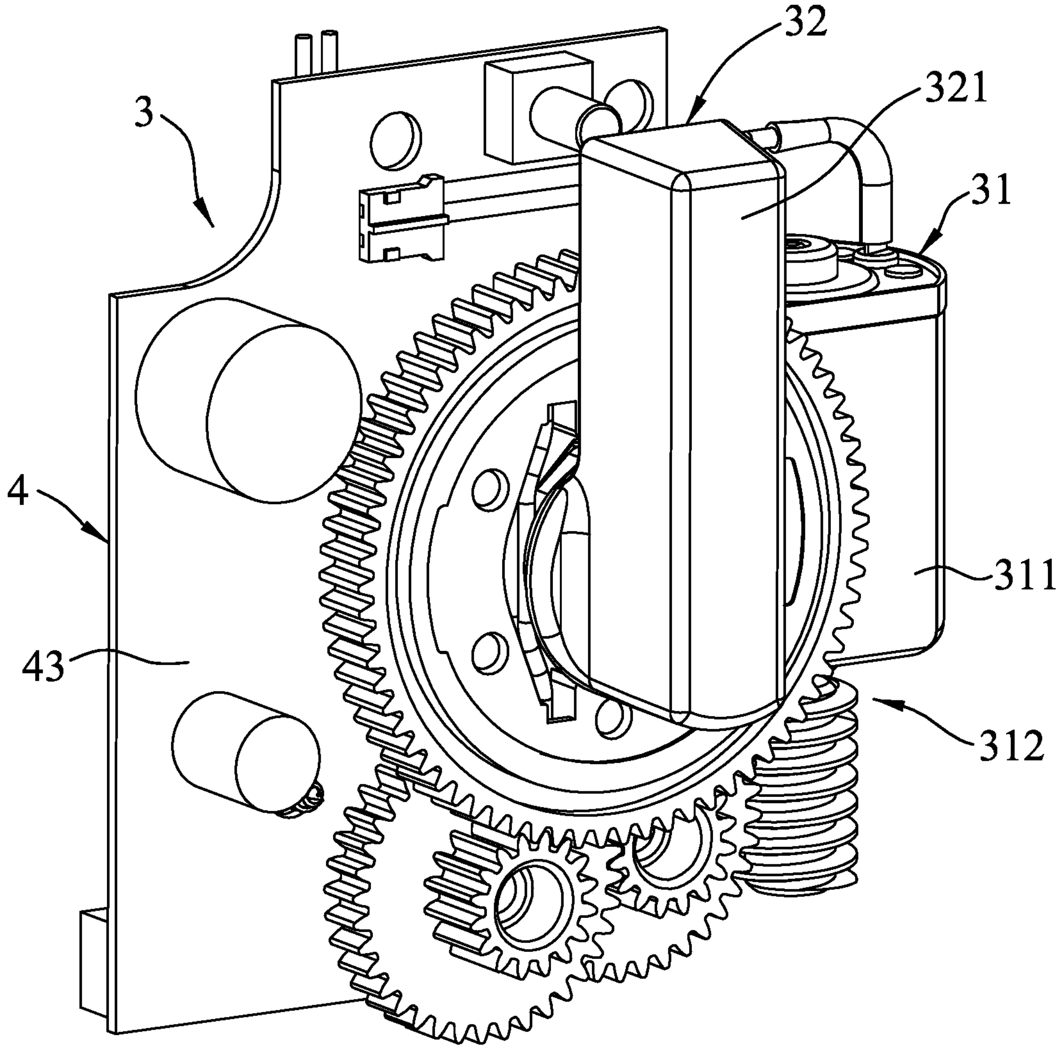
FIG. 4 is a perspective view illustrating a locking mechanism and a control device of the electronic lock according to an embodiment of the present disclosure.

Referring to FIGS. 1 to 3, an electronic lock 100 according to a first embodiment of this disclosure is adapted to be installed on a door 800 (e.g., a swing door) of an enclosed space(e.g., a room). The door 800 may be a left-hand door or a right-hand door. In this disclosure, the door 800 is an inswing door, and FIGS. 1 to 3 are viewed from a perspective of an interior of the enclosed space. For example, the electronic lock 100 is installed on an inner side of the door that faces the interior of the enclosed space. As shown in FIGS. 1 and 2, the door 800 is a left-hand door, and a plurality of hinges 801 are mounted on a right side of the door 800. On the other hand, the door 800 shown in FIG. 3 is a right-hand door, and a plurality of hinges 801 are mounted on a left-side of the door 800.

Referring to FIGS. 1, 2, 4 and 7, the electronic lock 100 according to the first embodiment of this disclosure includes a housing 2, a locking mechanism 3, and a control device 4. The control device 4 is electrically connected to the locking mechanism 3.

Figure 19:
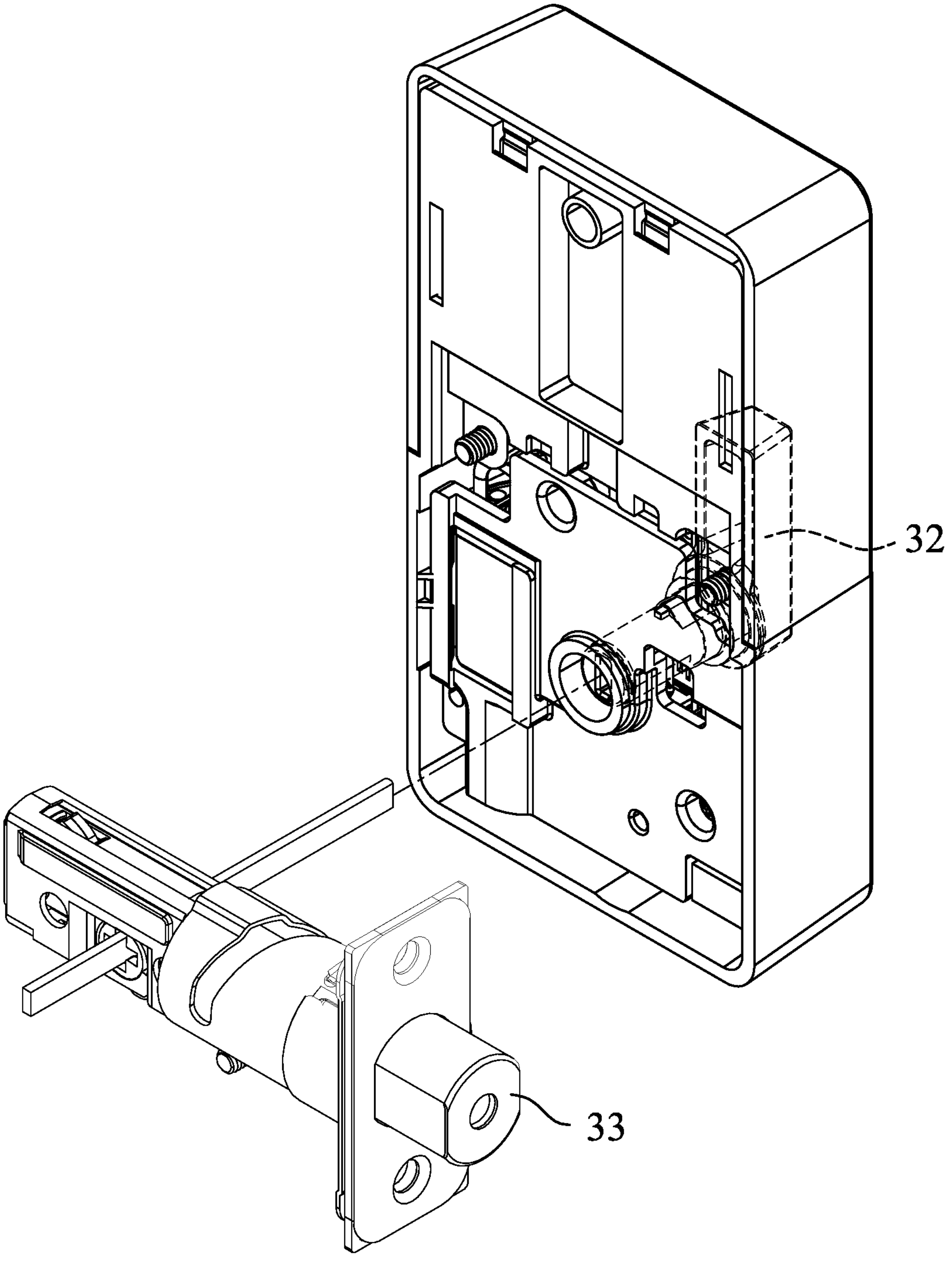
FIG. 19 is a perspective view of the electronic lock according to the first embodiment of the present disclosure.

The locking mechanism 3 includes an electronic driving module 31 that is disposed in the housing 2, a deadbolt 33, and a turning-piece module 32 (e.g., a thumb turn) that is connected to the electronic driving module 31 and the deadbolt 33 (see FIG. 19). A part of the turning-piece module 32 protrudes outside of the housing 2.

The electronic driving module 31 is controlled by the control device 4 to drive the turning-piece module 32 to rotate. In this embodiment, the electronic driving module 31 includes a motor 311 that is electrically connected to the control device 4, and a transmission system 312 that is connected between the motor 311 and the turning-piece module 32. Since there is a multitude of available types of electronic driving modules, and since the electronic driving module 31 is not the emphasis of this disclosure, details of the electronic driving module 31 will not be further described hereinafter for the sake of brevity. For example, the transmission system 312 is a set of gears.

Referring to FIGS. 1, 2, 3 and 5, the turning-piece module 32 is configured to rotate among a first position (see FIG. 1) corresponding to a first state of the electronic lock 100, and a second position (see FIG. 2) and a third position (see FIG. 3) both corresponding to a second state of the electronic lock 100. In this embodiment of this disclosure, the first state of the electronic lock 100 is a locking state, and the first position of the turning-piece module 32 is a locking position for locking the door 800 (see FIG. 1); the second state of the electronic lock 100 is an unlocking state, the second position of the turning-piece module 32 is a left-open unlocking position for unlocking the door 800 (i.e. the left-hand door) (see FIG. 2), and the third positon of the turning-piece module 32 is a right-open unlocking position for unlocking the door 800 (i.e. the right-hand door) (see FIG. 3). The turning-piece module 32 is configured to rotate in one of a first manner where the turning-piece module 32 is manually operated and a second manner where the turning-piece module 32 is driven by the electronic driving module 31.

The turning-piece module 32 is further configured to, while rotating, drive the deadbolt 33 to move between a projection position where the deadbolt 33 projects from the door 800 (see FIG. 1) into a door strike (not shown), and a retraction position where the deadbolt 33 retracts into the door 800 (see FIGS. 2 and 3). In the first embodiment, the deadbolt 33 is at the projection position when the turning-piece module 32 is at the first position (i.e., the electronic lock 100 is in the locking state), and the deadbolt 33 is at the retraction position when the turning-piece module 32 is at the second position and the third position (i.e., the electronic lock 100 is in the unlocking state). Specifically, the turning-piece module 32 drives the deadbolt 33 to move from the retraction position to the projection position when being rotated from the second position or the third position to the first position, and drives the deadbolt 33 to move back to the retraction position when being rotated from the first position to the second position or the third position.

Figure 6:
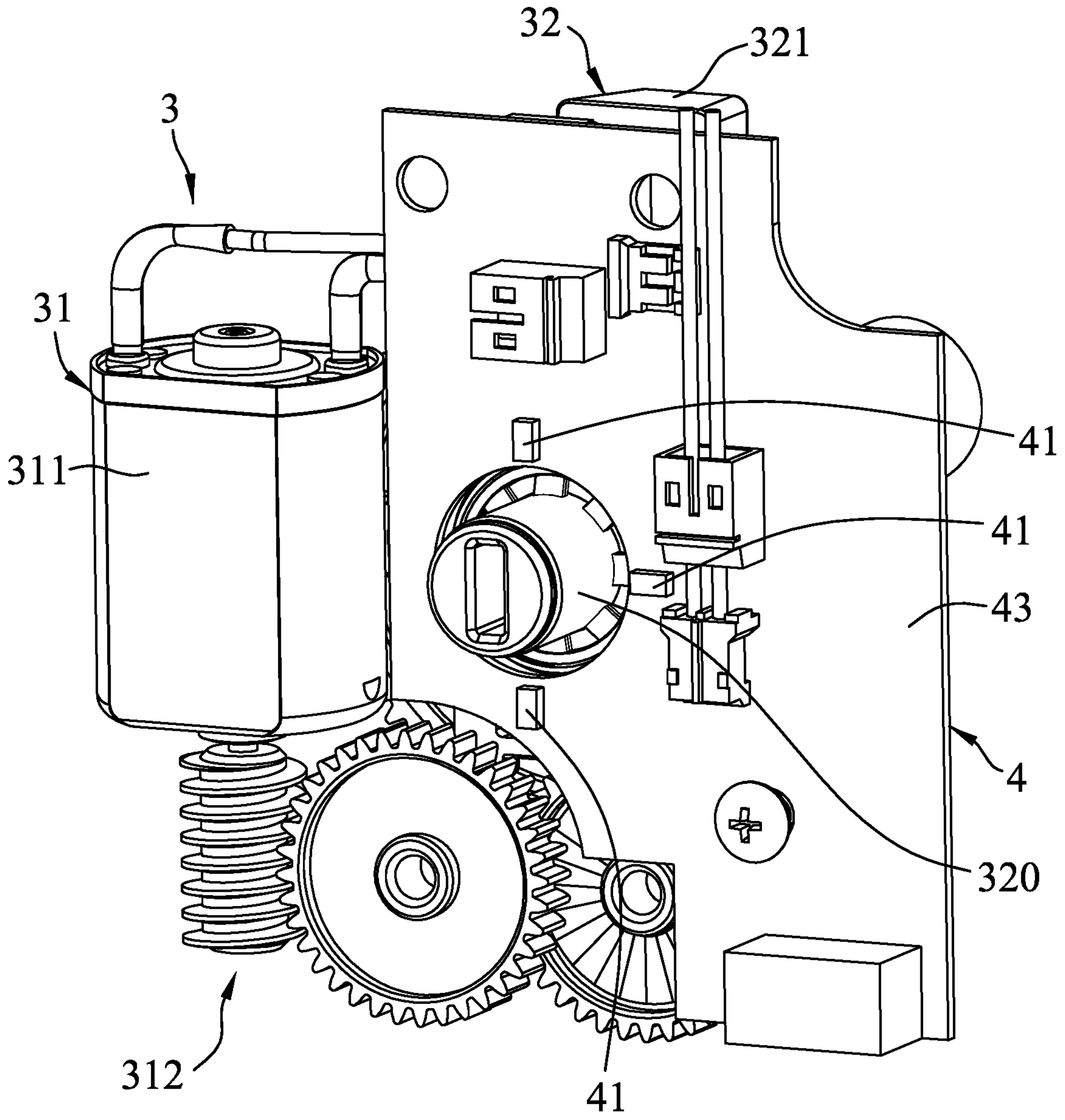
FIG. 6 is a fragmentary perspective view of the electronic lock viewed from a different angle according to an embodiment of the present disclosure.
Figure 7:
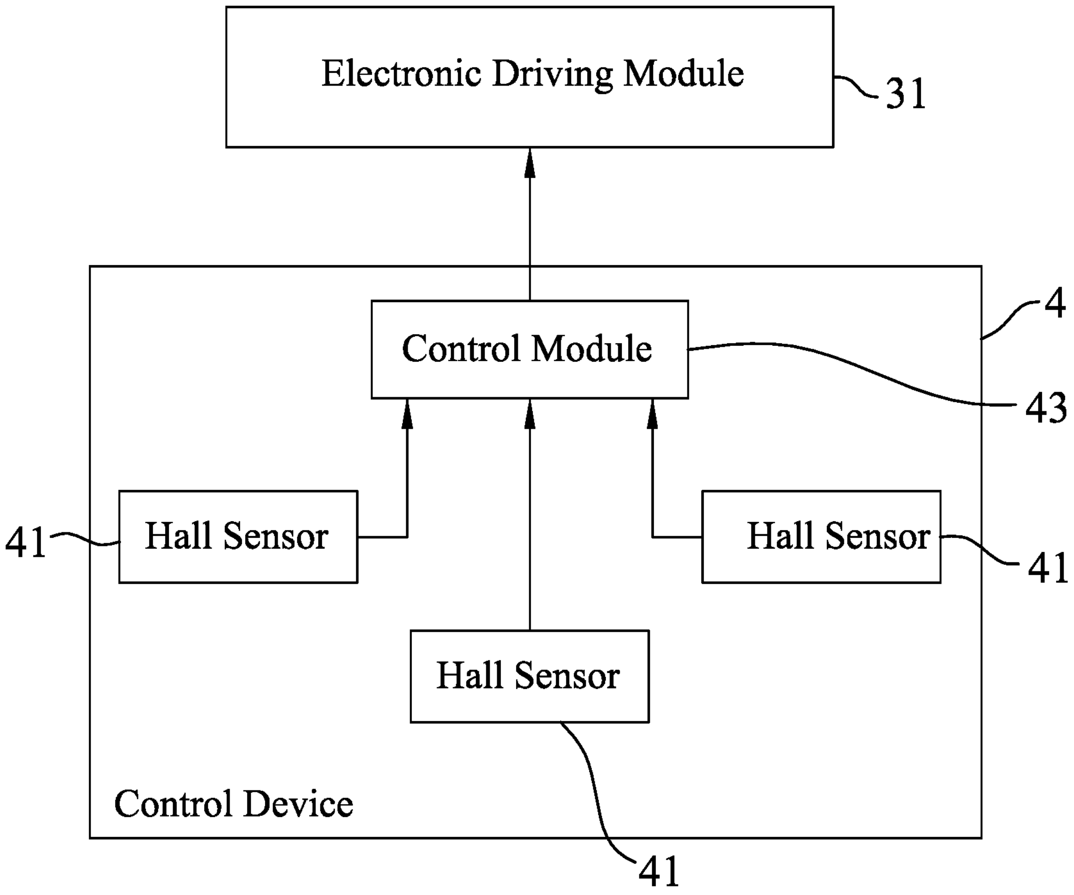
FIG. 7 is a block diagram of the electronic lock according to an embodiment of the present disclosure.

Referring to FIGS. 3, to 6, in this embodiment, the turning-piece module 32 includes a shaft 320 connected to the electronic driving module 31 and the deadbolt 33. The shaft 320 engages with a gear of the transmission system 312 so as to be driven by the electronic driving module 31 to rotate for further moving the deadbolt 33. The turning-piece module 32 further includes a turning piece 321 connected to one end of the shaft 320 opposite to the deadbolt 33. The turning piece 321 is disposed outside of the housing 2, and is configured to be manually operated to rotate the shaft 320, thereby moving the deadbolt 33 to switch between the projection position and the retraction position. The turning-piece module 32 further includes a ring-shaped component 322 fitting over the shaft 320 to co-rotate with the shaft 320. A connection structure between the turning piece 321 and the deadbolt 33 is well-known in the art, so details thereof will be omitted herein for the sake of brevity.

Figure 5:
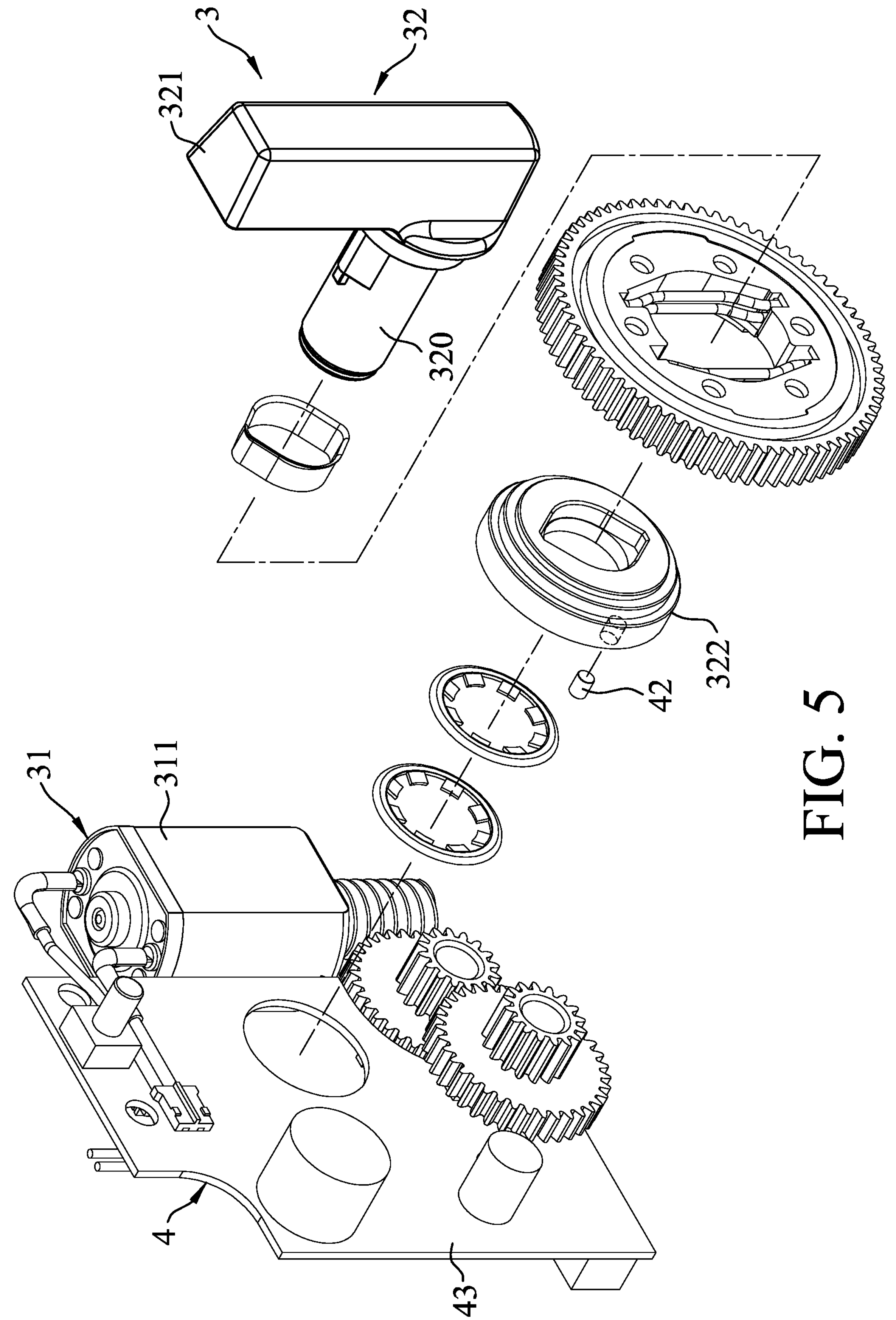
FIG. 5 is a fragmentary exploded perspective view of the electronic lock shown in FIG. 4.
Figure 8:
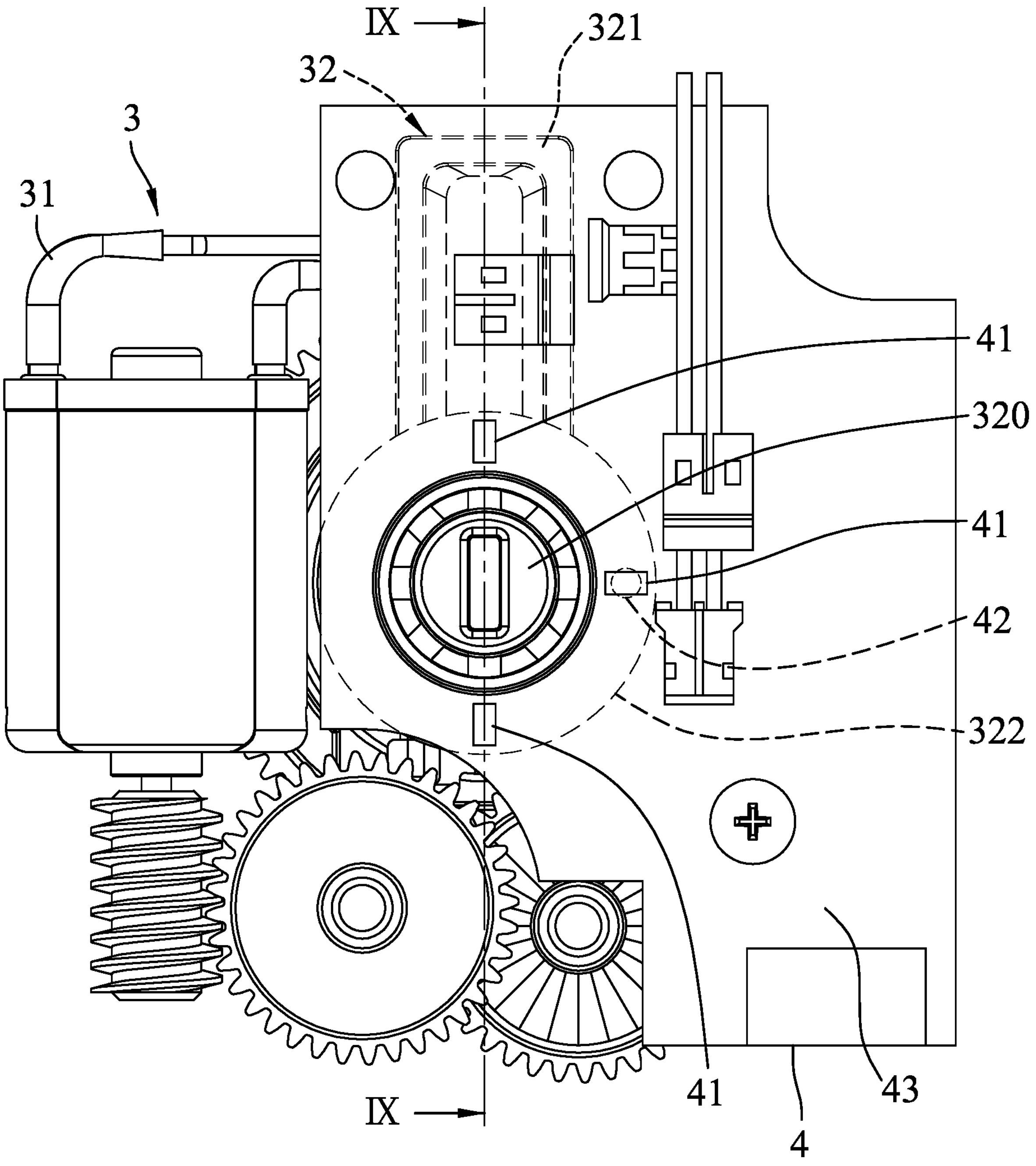
FIG. 8 is a side view illustrating a position of a magnetic component relative to Hall sensors when a turning-piece module is in a first position according to the first embodiment of the present disclosure.
Figure 9:
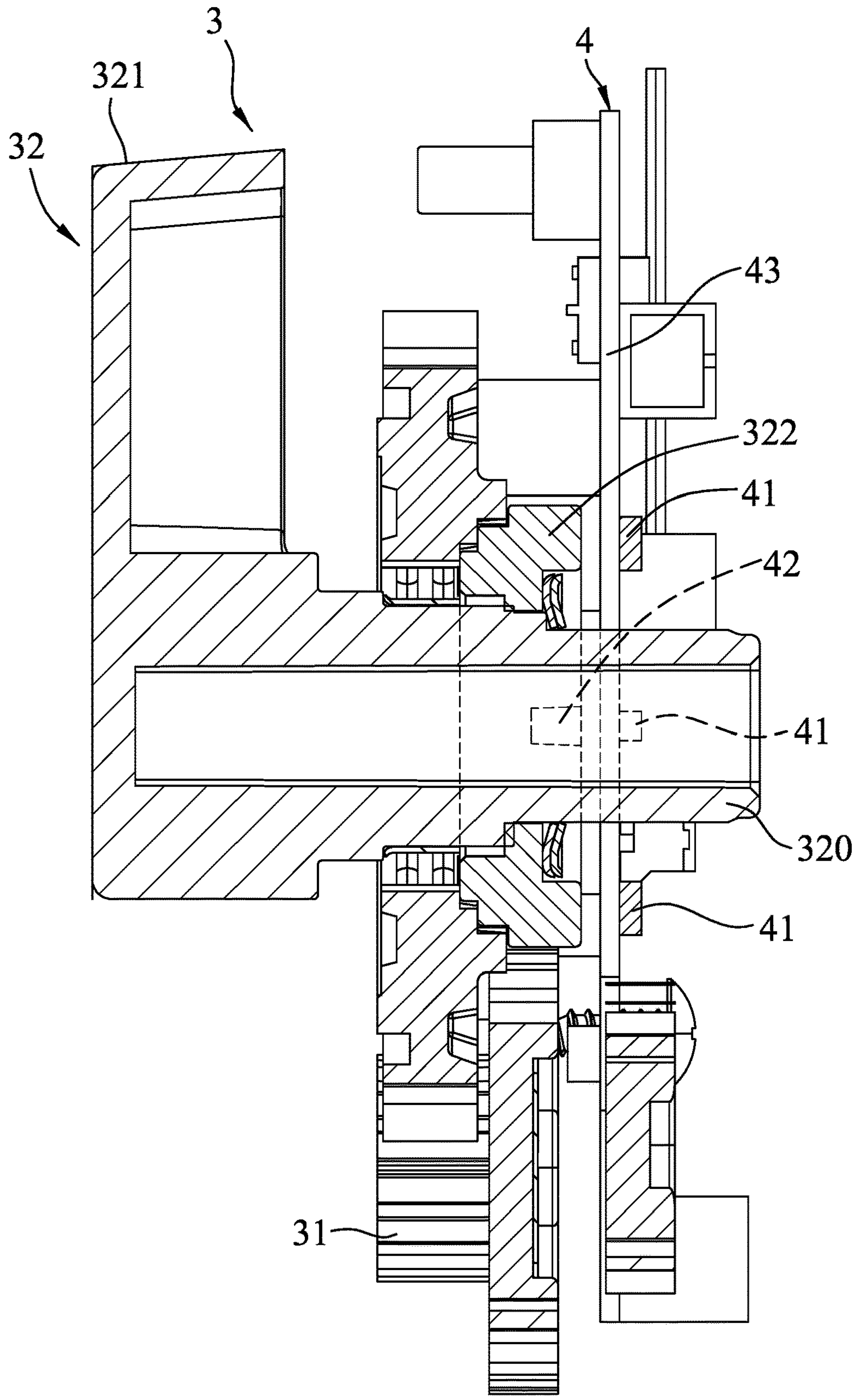
FIG. 9 is a cross-sectional view taken along a line IX-IX in FIG. 8, which illustrates the position of the magnetic component relative to the Hall sensors when the turning-piece module is in the first position according to the first embodiment of the present disclosure.

Referring to FIGS. 5, to 8, the control device 4 includes three Hall sensors 41, a magnetic component 42, and a control module 43 that is electrically connected to the Hall sensors 41 and the motor 311 of the electronic driving module 31.

The Hall sensors 41 are disposed to surround a rotation axis of the turning-piece module 32, and are angularly spaced apart from each other. In this embodiment, for adjacent two of the Hall sensors 41, a difference between angular positions respectively of these two Hall sensors 41 with respect to the rotation axis of the turning-piece module 32 is 90 degrees.

Figure 10:
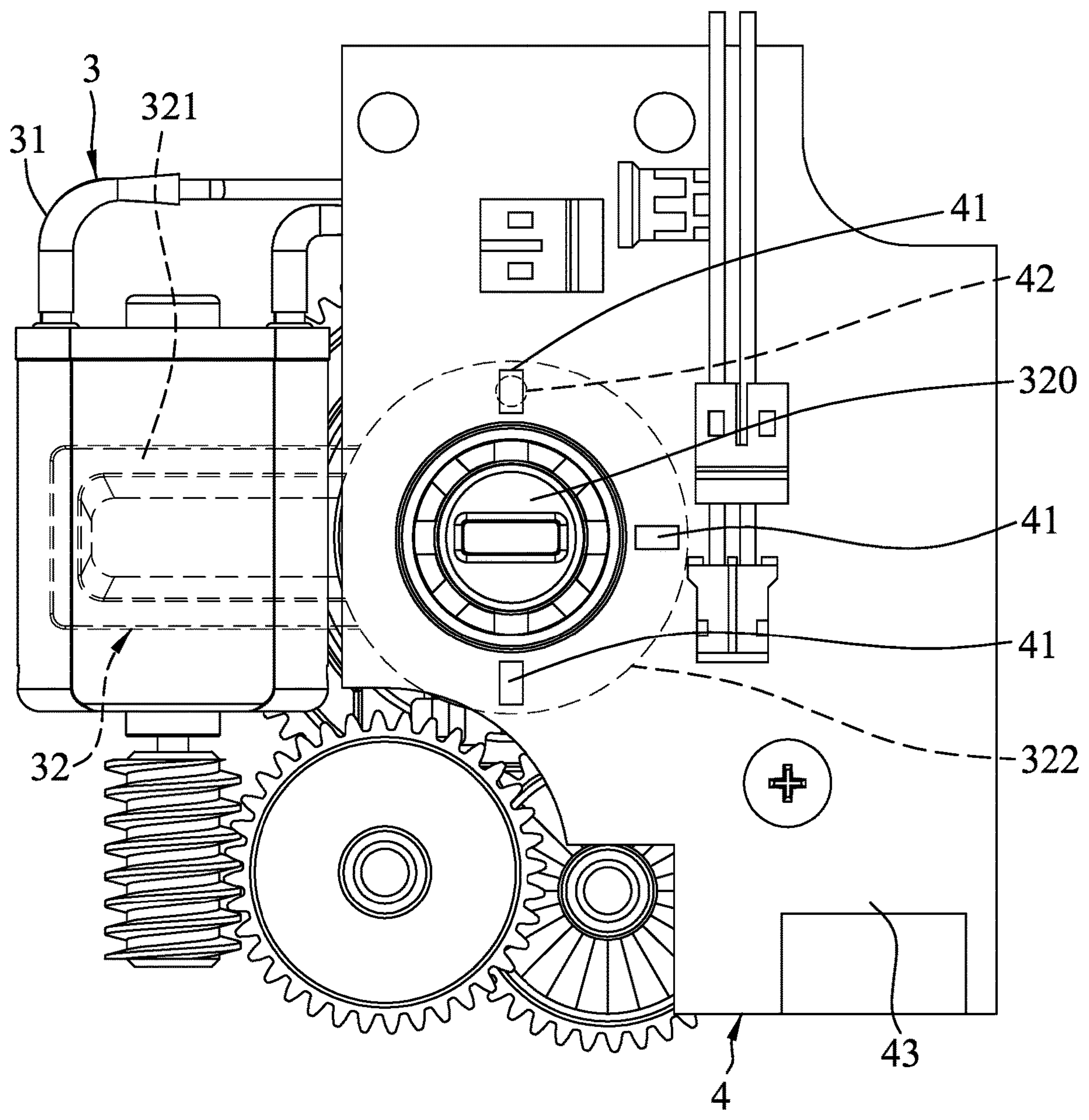
FIG. 10 is a side view illustrating a position of the magnetic component relative to the Hall sensors when the turning-piece module is in a second position according to the first embodiment of the present disclosure.
Figure 11:
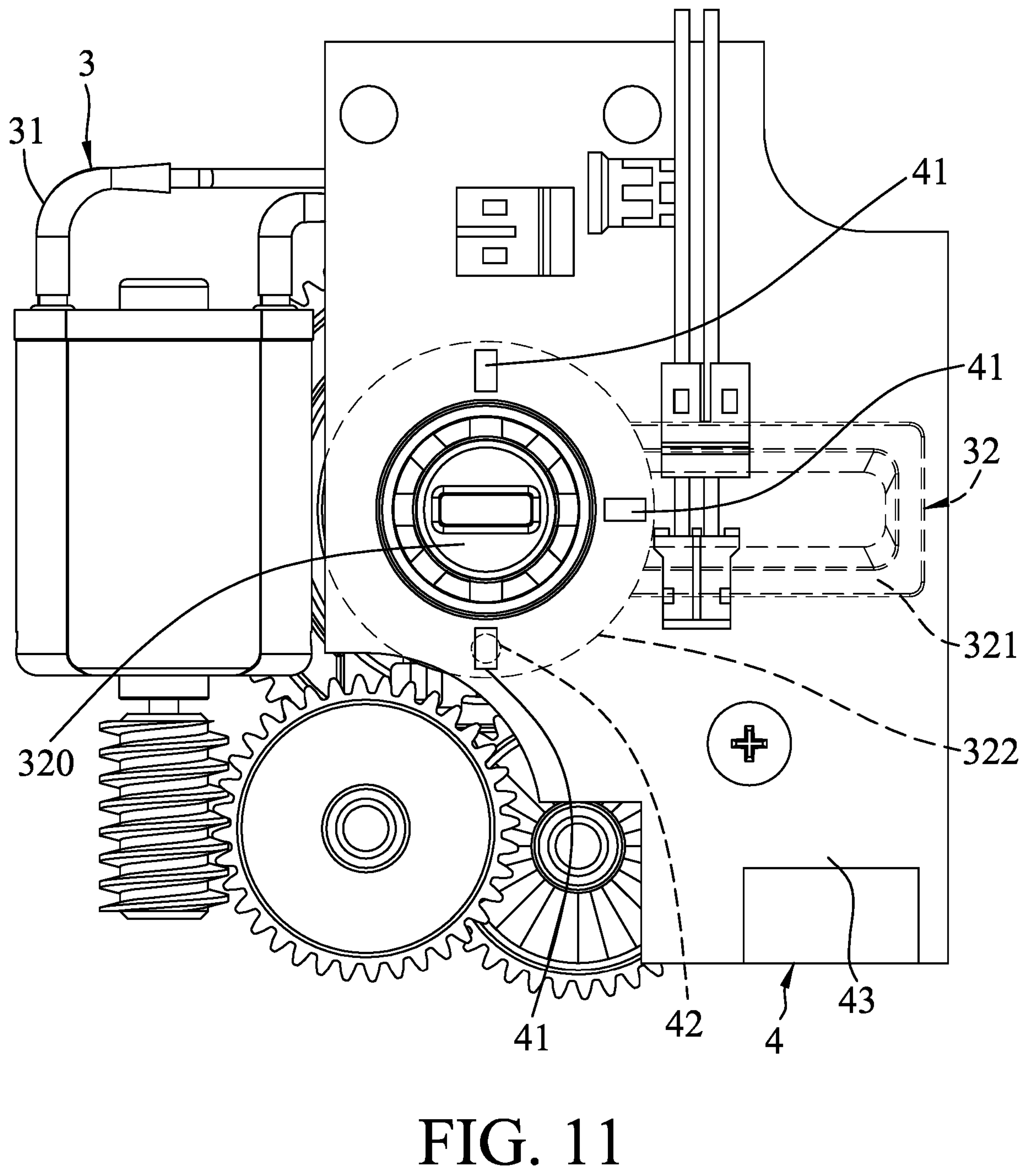
FIG. 11 is a side view illustrating a position of the magnetic component relative to the Hall sensors when the turning-piece module is in a third position according to the first embodiment of the present disclosure.
Figure 12:
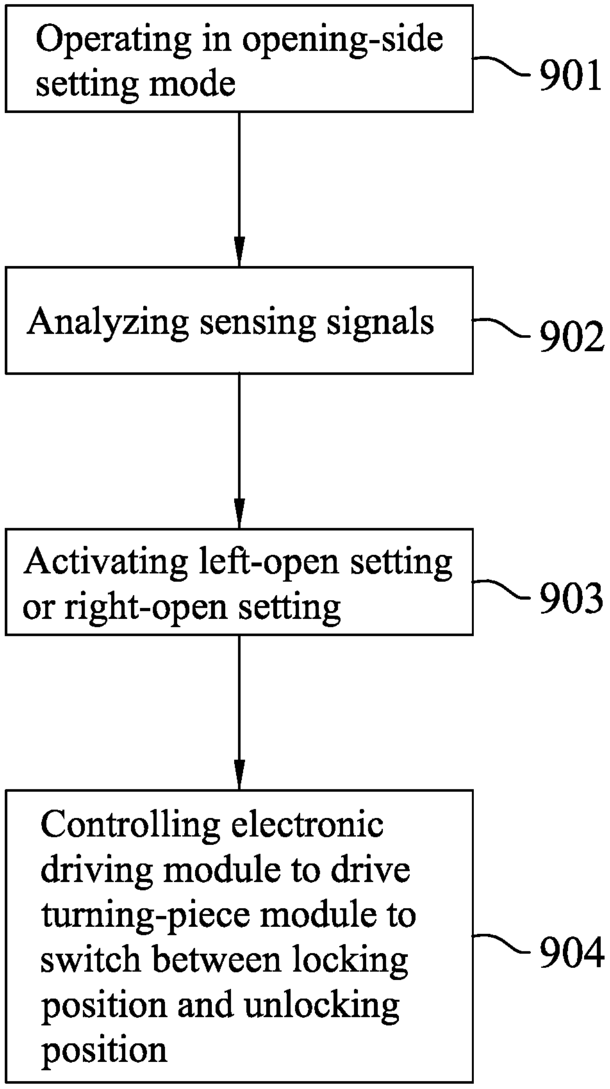
FIG. 12 is a flow chart illustrating a method for setting up the electronic lock according to an embodiment of the present disclosure.

Referring to FIGS. 5, and 7 to 11, the magnetic component 42 is fixedly mounted on the ring-shaped component 322 to co-rotate with the turning-piece module 32 relative to the Hall sensors 41. When the turning-piece module 32 is in one of the first position, the second position and the third position, the magnetic component 42 is aligned with one of the Hall sensors 41 in a direction along the rotation axis. Each one of the Hall sensors 41 is configured to detect a presence of the magnetic component 42 and to generate a sensing signal upon detecting the magnetic component 42. According to the first embodiment of this disclosure, when the turning-piece module 32 is in the first position (as shown in FIG. 8), a right one of the Hall sensors 41 generates a sensing signal (hereinafter referred to as "signal B"); when the turning-piece module 32 is in the second position (as shown in FIG. 10), an upper one of the Hall sensors 41 generates a sensing signal (hereinafter referred to as "signal C"); and when the turning-piece module 32 is in the third position (as shown in FIG. 11), a lower one of the Hall sensors 41 generates a sensing signal (hereinafter referred to as "signal A").

The control module 43 is configured to control the electronic driving module 31 to operate. When operating, the electronic driving module 31 drives the turning-piece module 32 to rotate. The control module 43 is further configured to operate in an opening-side setting mode for activating one of a left-open setting and a right-open setting based on two of the sensing signals that are first received respectively from two of the Hall sensors 41 without controlling the electronic driving module 31 to drive the turning-piece module 32 to rotate. The control module 43 is configured to operate in the opening-side setting mode when powered on for the first time. The control module 43 may be programmed according to the left-open setting, so as to electrically control the electronic driving module 31 to drive the turning-piece module 32 to rotate only between the first position and the second position when activating the left-open setting. On the other hand, the control module 43 may be programmed according to the right-open setting, so as to electrically control the electronic driving module 31 to drive the turning-piece module 32 to rotate only between the first position and the third position when activating the right-open setting.

The control module 43 is further configured, upon activating the left-open setting, to automatically control the electronic driving module 31 to drive the turning-piece module 32 to switch between the first position and the second position once, while upon activating the right-open setting, to automatically control the electronic driving module 31 to drive the turning-piece 32 to switch between the first position and the third position once.

To install the electronic lock 100 on the door 800, the deadbolt 33 is set to be in the projection position, and the turning-piece module 32 is set to be in the first position. Subsequently, the deadbolt 33 is connected to the turning-piece module 32.

Referring to FIGS. 8, and 10 to 12, after the electronic lock 100 is installed on the door 800, the electronic lock 100 is powered on for the first time such that the electronic lock 100 is activated to implement a method for setting up the electronic lock 100. Specifically, the method is implemented to automatically determine whether the door 800 on which the electronic lock 100 is installed is a left-hand door or a right-hand door and then to automatically activate the left-open setting or the right-open setting according to the determination. The method for setting up the electronic lock 100 includes steps 901 to 904.

In step 901, the control module 43 operates in the opening-side setting mode to wait for the sensing signals from the Hall sensors 41 when powered on for the first time. In step 901, the control module 43 is operating without controlling the electronic driving module 31 to drive the turning-piece module 32 to rotate.

At this stage, a user may manually turn the turning piece 321 to make the turning-piece module 32 rotate between the first position and the second position for the left-hand door, or rotate between the first position and the third position for the right-hand door. The magnetic component 42, which co-rotates with the turning-piece module 32, is also moved to be aligned with two of the Hall sensors 41 in sequence. When the two of the Hall sensors 41 detect the presence of the magnetic component 42, the two of the Hall sensors 41 generate the sensing signals in sequence and transmit the sensing signals to the control module 43, and the control module 43 receives the sensing signals.

In step 902, the control module 43 analyzes two of the sensing signals that are first received respectively from two of the Hall sensors 41 (hereinafter referred to as "first-received signals") in the opening-side setting mode. based on the first-received signals (i.e., signal A and signal B, or signal C and signal B), the control module 43 may determine which two of the Hall sensors 41 sent the first-received signals.

In step 903, the control module 43 activates one of the left-open setting and the right-open setting according to the first-received signals. When the control module 43 determines that the first-received signals are signal C and signal B, the control module 43 activates the left-open setting. On the other hand, when the control module 43 determines that the first-received signals are signal A and signal B, the control module 43 activates the right-open setting.

In step 904, upon activating said one of the left-open setting and the right-open setting, the control module 43 automatically controls the electronic driving module 31 to drive the turning-piece module 32 to switch between the first position and a corresponding one of the second position and the third position once. Specifically, upon activating the left-open setting, the control module 43 automatically controls the electronic driving module 31 to drive the turning-piece module 32 to switch between the first position and the second position once, whereby the deadbolt 33 is driven by the turning-piece module 32 to switch between the projection position and the retraction position once; and upon activating the right-open setting, the control module 43 automatically controls the electronic driving module 31 to drive the turning-piece module 32 to switch between the first position and the third position once, whereby the deadbolt 33 is driven by the turning-piece module 32 to switch between the projection position and the retraction position once. By completing the foregoing operation of step 904, the user may be aware that the electronic lock 100 has been set.

In some embodiments of this disclosure, the control module 43 is configured to operate in the opening-side setting mode when being powered on for the first time. However, it should be understood that in other embodiments, the control device 4 may further include a switch that is operable by a user to activate the control module 43 to operate in the opening-side setting mode. As various ways may be employed to activate the control module 43 to operate in the opening-side setting mode, this disclosure is not limited to the above.

Figure 13:
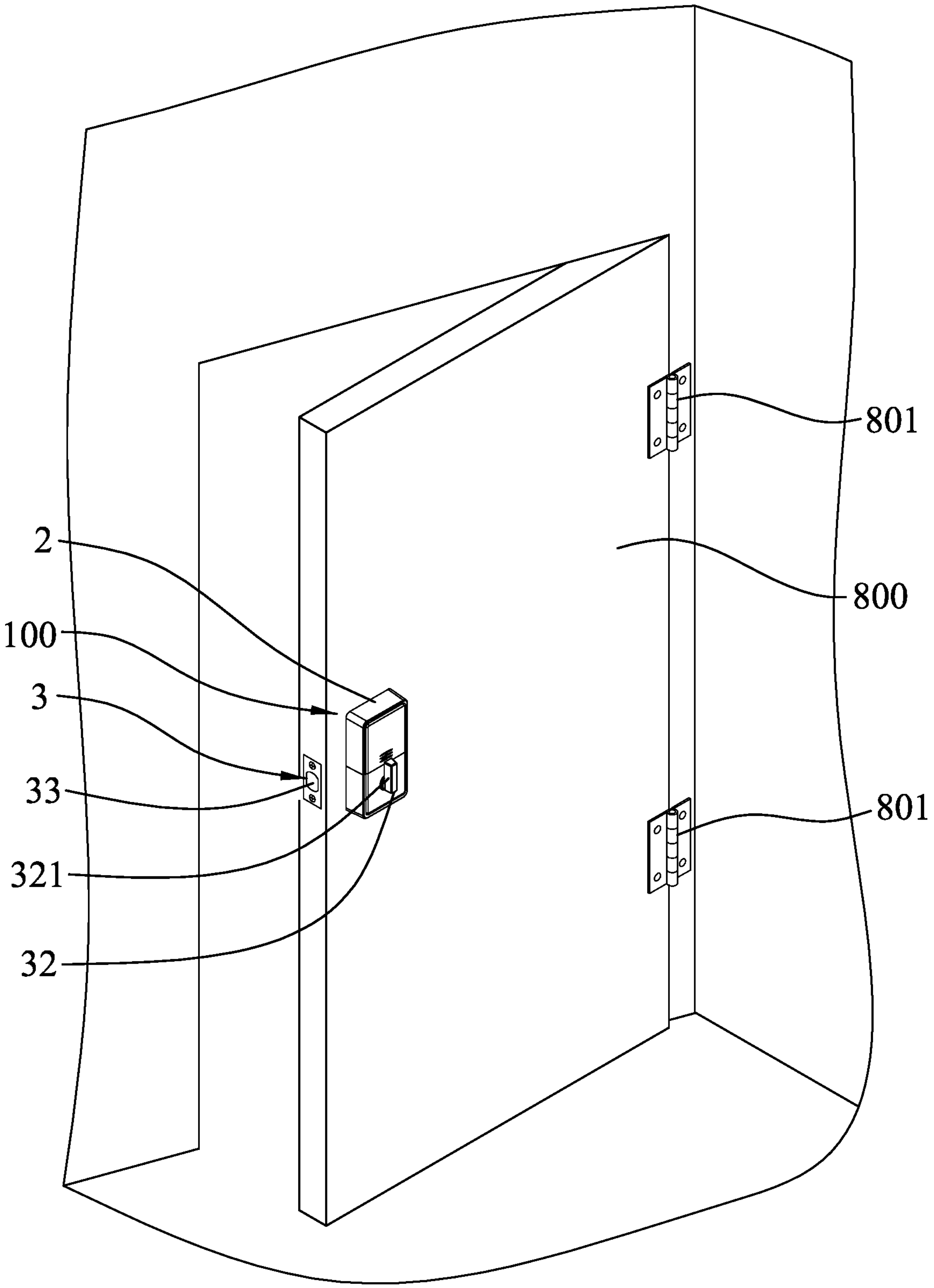
FIG. 13 is a fragmentary perspective view illustrating the electronic lock installed on a left-hand door according to a second embodiment of the present disclosure, where the deadbolt is in the retraction position.
Figure 14:
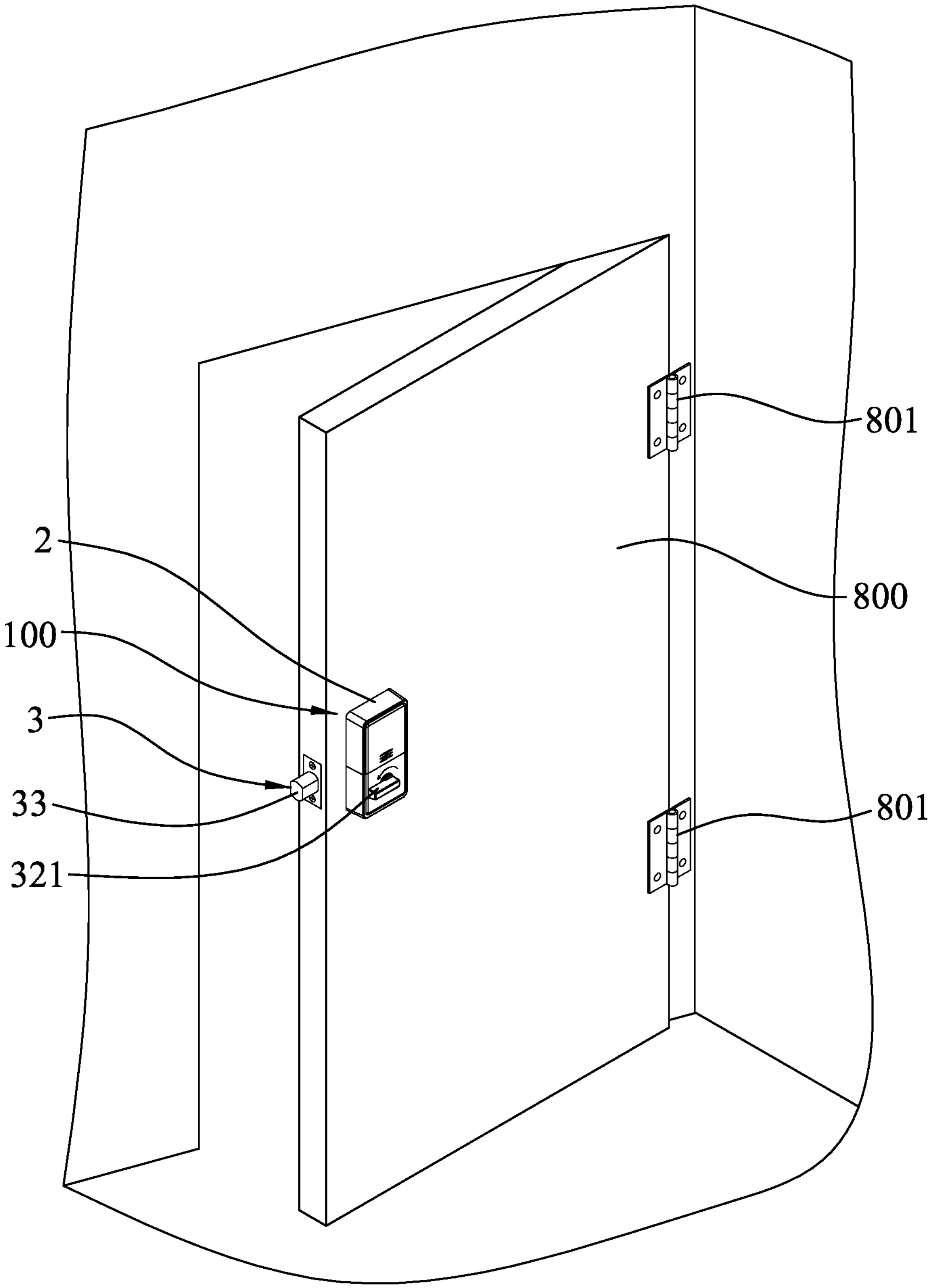
FIG. 14 is a fragmentary perspective view similar to FIG. 13 illustrating the deadbolt of the electronic lock in the projection position.
Figure 15:
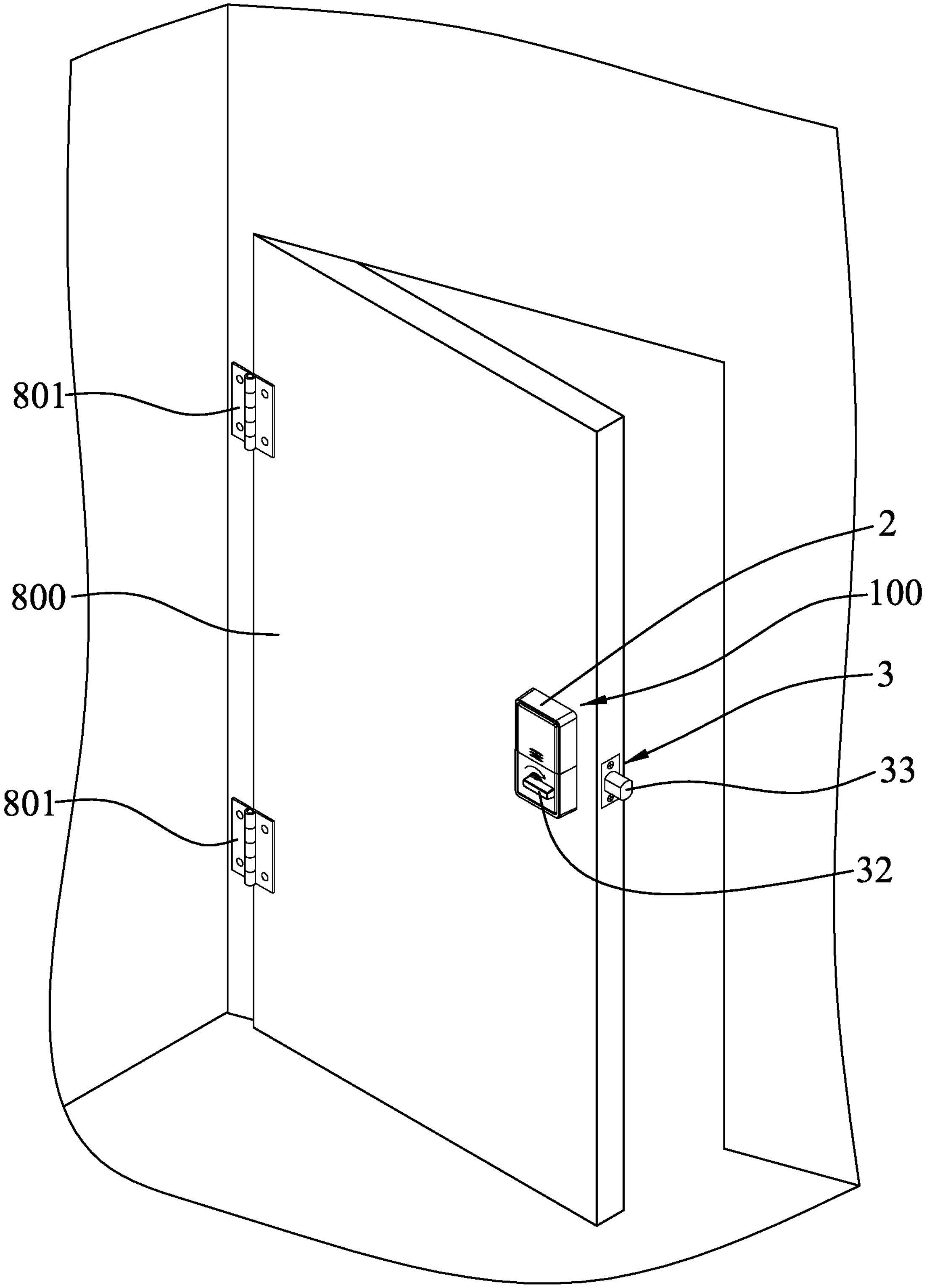
FIG. 15 is a fragmentary perspective view illustrating the electronic lock installed on a right-hand door according to the second embodiment of the present disclosure, where the deadbolt is in the projection position.
Figure 16:
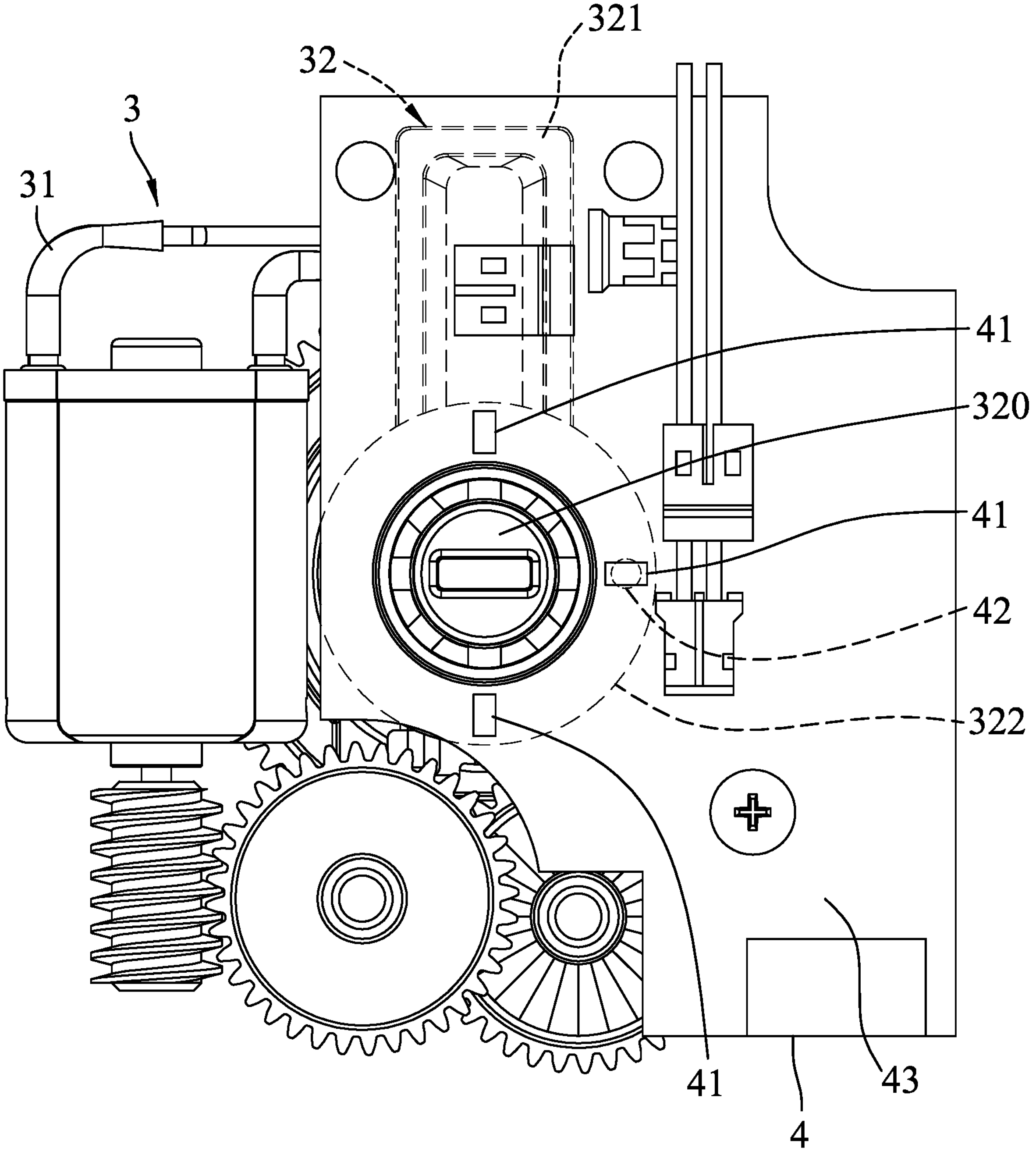
FIG. 16 is a side view illustrating a position of the magnetic component relative to the Hall sensors when the turning-piece module is in the first position according to the second embodiment of the present disclosure.
Figure 17:
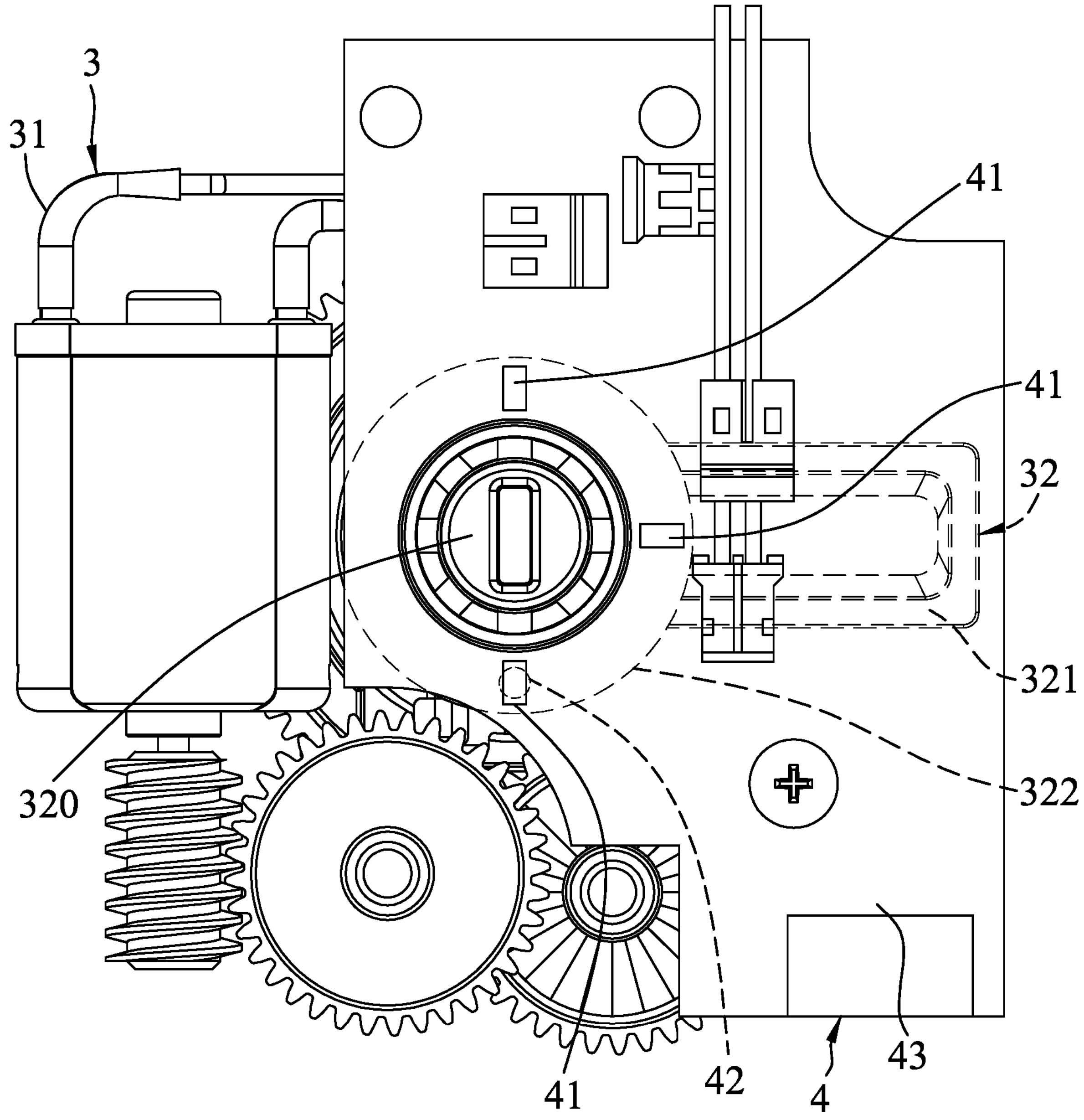
FIG. 17 is a side view illustrating the position of the magnetic component relative to the Hall sensors when the turning-piece module is in the third position according to the second embodiment of the present disclosure.
Figure 18:
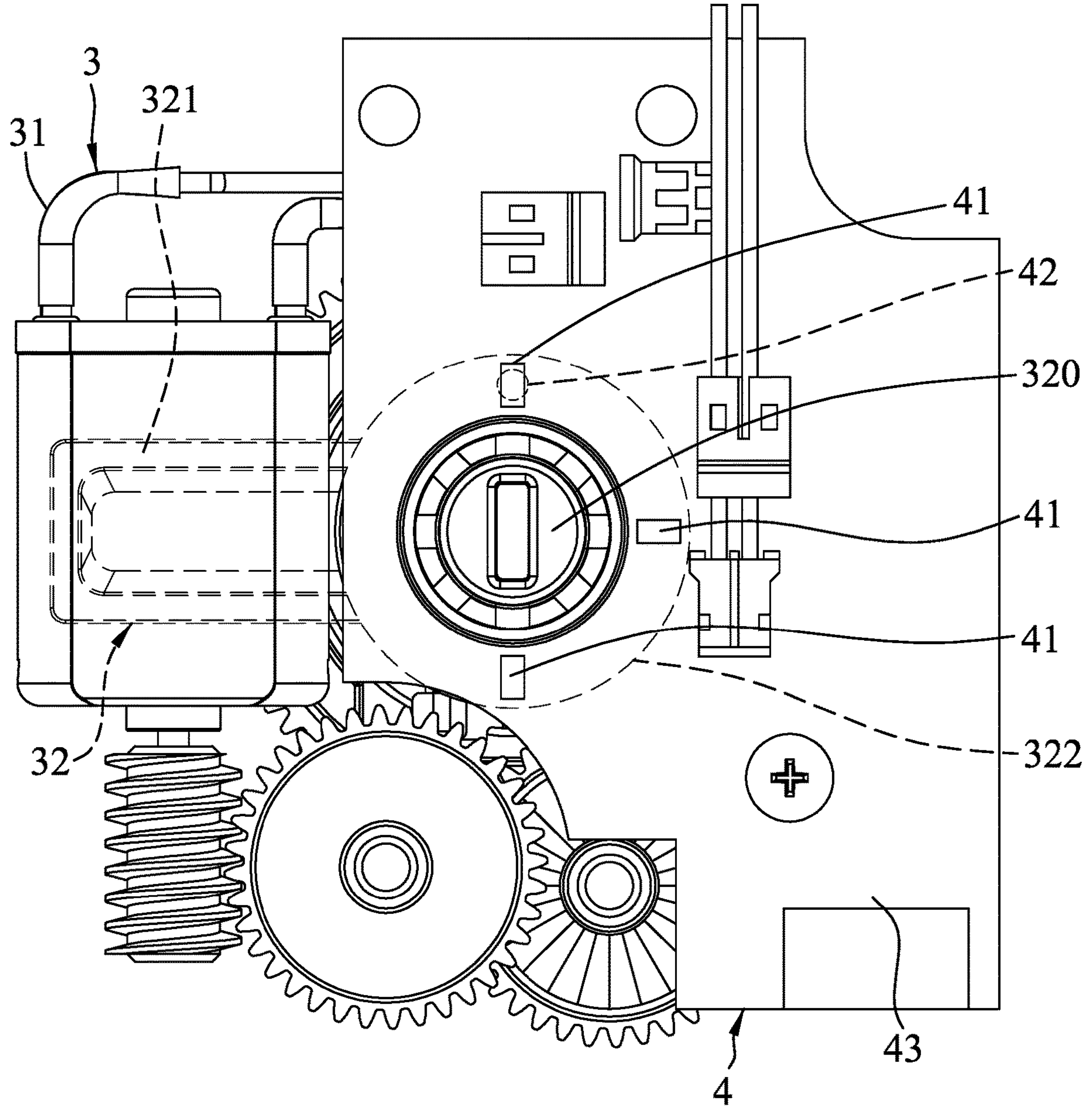
FIG. 18 is a side view illustrating the position of the magnetic component relative to the Hall sensors when the turning-piece module is in the second position according to the second embodiment of the present disclosure.

Referring to FIGS. 13 to 15, according to a second embodiment of this disclosure, the first state of the electronic lock 100 is the unlocking state, and the first position of the turning-piece module 32 is an unlocking position for unlocking the door 800 (see FIG. 13); the second state of the electronic lock is the locking state, the third position of the turning-piece module 32 is a left-open locking position for locking the door 800 (i.e. the left-hand door) (see FIG. 14), and the second positon of the turning-piece module 32 is a right-open locking position for locking the door 800 (i.e. the right-hand door) (see FIG. 15). In the second embodiment, the deadbolt 33 is at the retraction position when the turning-piece module 32 is at the first position (i.e., the electronic lock 100 is in the unlocking state), and the deadbolt 33 is at the projection position when the turning-piece 32 is at the second position and the third position (i.e., the electronic lock 100 is in the locking state). Specifically, the turning-piece module 32 drives the deadbolt 33 to move from the projection position to the retraction position when being rotated from the second position or the third position to the first position, and drives the deadbolt 33 to move from the retraction position to the projection position when being rotated from the first position to the second position or the third position.

In this embodiment, to install the electronic lock 100 on the door 800, the deadbolt 33 is set to be in the retraction position, and the turning-piece module 32 is set to be in the first position. Subsequently, the deadbolt 33 is connected to the turning-piece module 32.

Referring to FIGS. 13 to 18, according to the second embodiment of this disclosure, when the turning-piece module 32 is in the first position (see FIGS. 13 and 16), the right one of the Hall sensors 41 generates the signal B; when the turning-piece module 32 is in the third position (see FIGS. 14 and 17), the lower one of the Hall sensors 41 generates the signal A; and when the turning-piece module 32 is in the second position (see FIGS. 15 and 18), the upper one of the Hall sensors 41 generates the signal C. When the control module 43 determines that the first-received signals are the signal A and the signal B, the control module 43 activates the left-open setting. On the other hand, when the control module 43 determines that the first-received signals are the signal C and the signal B, the control module 43 activates the right-open setting. Upon activating said one of the left-open setting and the right-open setting, the control module 43 automatically controls the electronic driving module 31 to drive the turning-piece module 32 to switch between the first position and the corresponding one of the second position and the third position once.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An electronic lock comprising:

a locking mechanism including an electronic driving module, a deadbolt, and a turning-piece module that is connected to said electronic driving module and said deadbolt, that is configured to be manually operated to rotate among a first position corresponding to a first state of said electronic lock, and a second position and a third position both corresponding to a second state of said electronic lock, and that is configured to drive said deadbolt to move between a projection position and a retraction position while rotating; and a control device including three Hall sensors that are disposed to surround a rotation axis of said turning-piece module and that are angularly spaced apart from each other, a magnetic component that is disposed on said turning-piece module so as to co-rotate with said turning-piece module relative to said Hall sensors, and a control module that is electrically connected to said Hall sensors and said electronic driving module and that is configured to control said electronic driving module to operate for driving said turning-piece module to rotate, wherein each of said Hall sensors is configured to detect a presence of said magnetic component and to generate a sensing signal upon detecting said magnetic component, wherein said control module is further configured to operate in an opening-side setting mode for activating one of a left-open setting and a right-open setting according to two of the sensing signals that are first received respectively from two of said Hall sensors without controlling said electronic driving module to drive said turning-piece module to rotate, and to control said electronic driving module to drive said turning-piece module to rotate between the first position and one of the second position and the third position according to the one of the left-open setting and the right-open setting that has been activated, wherein the first state of said electronic lock is a locking state and the second state of said electronic lock is an unlocking state, said deadbolt is at the projection position when said turning-piece module is at the first position, and said deadbolt is at the retraction position when said turning-piece module is at the second position and the third position, wherein said control module is configured to control said electronic driving module to drive said turning-piece module to rotate only between the first position and the second position when the left-open setting has been activated, and to control said electronic driving module to drive said turning-piece module to rotate only between the first position and the third position when the right-open setting has been activated, wherein said control module is further configured, upon activating the left-open setting, to automatically control said electronic driving module to drive said turning-piece module to switch between the first position and the second position once, and wherein said control module is further configured, upon activating the right-open setting, to automatically control said electronic driving module to drive said turning-piece module to switch between the first position and the third position once.

2. The electronic lock as claimed in claim 1, wherein said control module is configured to operate in the opening-side setting mode when being powered on for the first time.

3. The electronic lock as claimed in claim 1, wherein said turning-piece module includes a shaft connected to said electronic driving module and said deadbolt so as to be driven by said electronic driving module to rotate for moving said deadbolt, a turning piece connected to one end of said shaft opposite to said deadbolt and configured to be manually operated to rotate said shaft, and a ring-shaped component fitting over said shaft to co-rotate with said shaft, wherein said magnetic component is mounted on said ring-shaped component.

4. A method for setting up an electronic lock as claimed in claim 1, the method comprising:

the control module operating in the opening-side setting mode and receiving one or more of the sensing signals from the Hall sensors without controlling the electronic driving module to drive the turning-piece module to rotate;

the control module analyzing two of the sensing signals that are first received respectively from two of the Hall sensors;

the control module activating one of the left-open setting and the right-open setting based on the two of the sensing signals that are first received;

the control module controlling the electronic driving module to drive the turning-piece module to rotate only between the first position and the second position when the left-open setting has been activated, and controlling the electronic driving module to drive the turning-piece module to rotate only between the first position and the third position when the right-open setting has been activated;

upon activating the left-open setting, the control module automatically controlling the electronic driving module to drive the turning-piece module to switch between the first position and the second position once; and upon activating the right-open setting, the control module automatically controlling the electronic driving module to drive the turning-piece module to switch between the first position and the third position once.

5. The method as claimed in claim 4, wherein the control module operating in the opening-side setting mode is implemented only when the control module is powered on for the first time.

* * * * *